United States Patent [19]

Oka

[11] Patent Number: 4,949,587
[45] Date of Patent: Aug. 21, 1990

[54] REVERSE GEAR MECHANISM FOR VEHICLE GEAR TRANSMISSION

[75] Inventor: Yosio Oka, Saitama, Japan

[73] Assignee: Honda Giken Kogyo Kabushiki Kaisha, Tokyo, Japan

[21] Appl. No.: 781,565

[22] Filed: Sep. 30, 1985

[30] Foreign Application Priority Data

Oct. 1, 1984 [JP] Japan .................. 59-148625

[51] Int. Cl.$^5$ .................. F16H 3/08; F16H 3/14
[52] U.S. Cl. .................. 74/333; 74/360; 74/361; 192/54
[58] Field of Search ............ 74/404, 361, 337, 360, 74/414 TA, 359, 357, 333; 192/54, 55; 464/45, 46

[56] References Cited

U.S. PATENT DOCUMENTS

| 1,427,025 | 8/1922 | Schafly | 464/46 |
| 3,695,401 | 10/1972 | Nagasaki | 74/361 X |
| 4,004,641 | 1/1977 | Hendrickson | 464/45 X |
| 4,138,006 | 2/1979 | Benson | 192/54 X |
| 4,344,337 | 8/1982 | Nagasaki et al. | 74/404 X |
| 4,398,432 | 8/1983 | Quick | 74/360 X |

FOREIGN PATENT DOCUMENTS

| 157559 | 12/1939 | Fed. Rep. of Germany | 464/45 |
| 1137608 | 10/1962 | Fed. Rep. of Germany | 464/45 |
| 231824 | 2/1964 | Fed. Rep. of Germany | 464/46 |
| 56-76729 | 6/1981 | Japan | 192/54 |
| 57-97938 | 6/1982 | Japan | 464/38 |
| 2089000 | 6/1982 | United Kingdom . | |

Primary Examiner—Dwight Diehl
Attorney, Agent, or Firm—Armstrong, Nikaido, Marmelstein, Kubovcik & Murray

[57] ABSTRACT

A reverse gear mechanism in a vehicle gear transmission having a first shaft, a second shaft, and gear trains associated with the first and second shafts for transmitting the torque from one of the first and second shafts to the other. The reverse gear mechanism includes a reverse drive gear supported on the first shaft, a reverse driven gear supported on the second shaft, and an idle gear assembly interposed in meshing relation between the reverse drive and driven gears. The idle gear assembly is composed of a third shaft, a first idle gear supported on the third shaft and meshing with the reverse drive gear, a second idle gear supported on the third gear and meshing with the reverse driven gear, and a clutch unit interposed between the first and second idle gears for limiting the torque transmitted between the first and second idle gears to a prescribed value. The components of the power transmission mechanism can be designed reasonably and advantageously.

5 Claims, 3 Drawing Sheets

REVERSE GEAR MECHANISM FOR VEHICLE GEAR TRANSMISSION

BACKGROUND OF THE INVENTION

The present invention relates to a vehicle transmission, and more particularly to a reverse gear mechanism for use in a vehicle gear transmission.

There are known vehicle gear transmissions having two shafts (primary and secondary shafts or main and counter shafts) and a plurality of gears interposed in meshing relation between these two gears. Reverse gear mechanisms including idle gears are widely employed in such known vehicle gear transmissions.

Power transmission units for use on vehicles include various parts involved in torque transmission, such as a propeller shaft, wheel axles, etc., in addition to the shafts in the gear transmissions. The torque transmitted by one of such parts is defined by the speed reduction ratio from the engine to that component (the ratio of the r.p.m. of the component to the r.p.m. of the engine). The possible maximum torque, which is one of the most important factors for determining the shaft diameters, therefore varies dependent on the speed reduction ratio. In a vehicle power transmission unit including a gear transmission having a primary shaft connected to an engine and a secondary shaft connected to a drive wheel, for example, the torque that can be transmitted by the parts from the secondary shaft to the wheel axle inclusive varies in proportion to the speed reduction ratio of a selected gear of the gear transmission.

In general, the speed reduction ratio of the reverse gear is selected to be larger than that of the low gear since the driver normally wishes to move the vehicle at a lower speed when it is to be moved back. Therefore, the possible maximum torque transmitted by the foregoing parts such as the secondary shaft, etc. is largest when the reverse gear is selected. Heretofore, the dimensions, such as shaft diameters, of the parts in the power transmission unit have been determined in view of the speed reduction ratios from the engine to the parts at the time the vehicle is to be moved back. However, it would seldom happen for the drive wheel to require a large torque when the vehicle is moving back. Large torques are required more frequently when the low gear is selected. An increase in the diameter of a shaft involved in power transmission results directly in an increase in the rotational inertial mass of the shaft, thereby making the fuel economy of the vehicle poor and requiring the brake unit to be large in size. In view of these difficulties, the conventional gear transmission which requires the shaft diameters to be determined as described above still remains to be improved.

SUMMARY OF THE INVENTION

It is an object of the present invention to provide a reverse gear mechanism for use in vehicle gear transmissions which allows the dimensions, such as shaft diameters, of the parts of a power transmission unit to be determined more reasonably and advantageously.

According to the present invention, there is provided a reverse gear mechanism in a vehicle gear transmission having a first shaft, a second shaft, and gear trains associated with the first and second shafts for transmitting the torque from one of the first and second shafts to the other. The reverse gear mechanism includes a reverse drive gear supported on the first shaft, a reverse driven gear supported on the second shaft, and an idle gear assembly interposed in meshing relation between the reverse drive and driven gears. The idle gear assembly is composed of a third shaft, a first idle gear supported on the third shaft and meshing with the reverse drive gear, a second idle gear supported on the third gear and meshing with the reverse driven gear, and a clutch unit interposed between the first and second idle gears for limiting the torque transmitted between the first and second idle gears to a prescribed value. The components of the power transmission mechanism can be designed reasonably and advantageously.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENT

Figure 1:
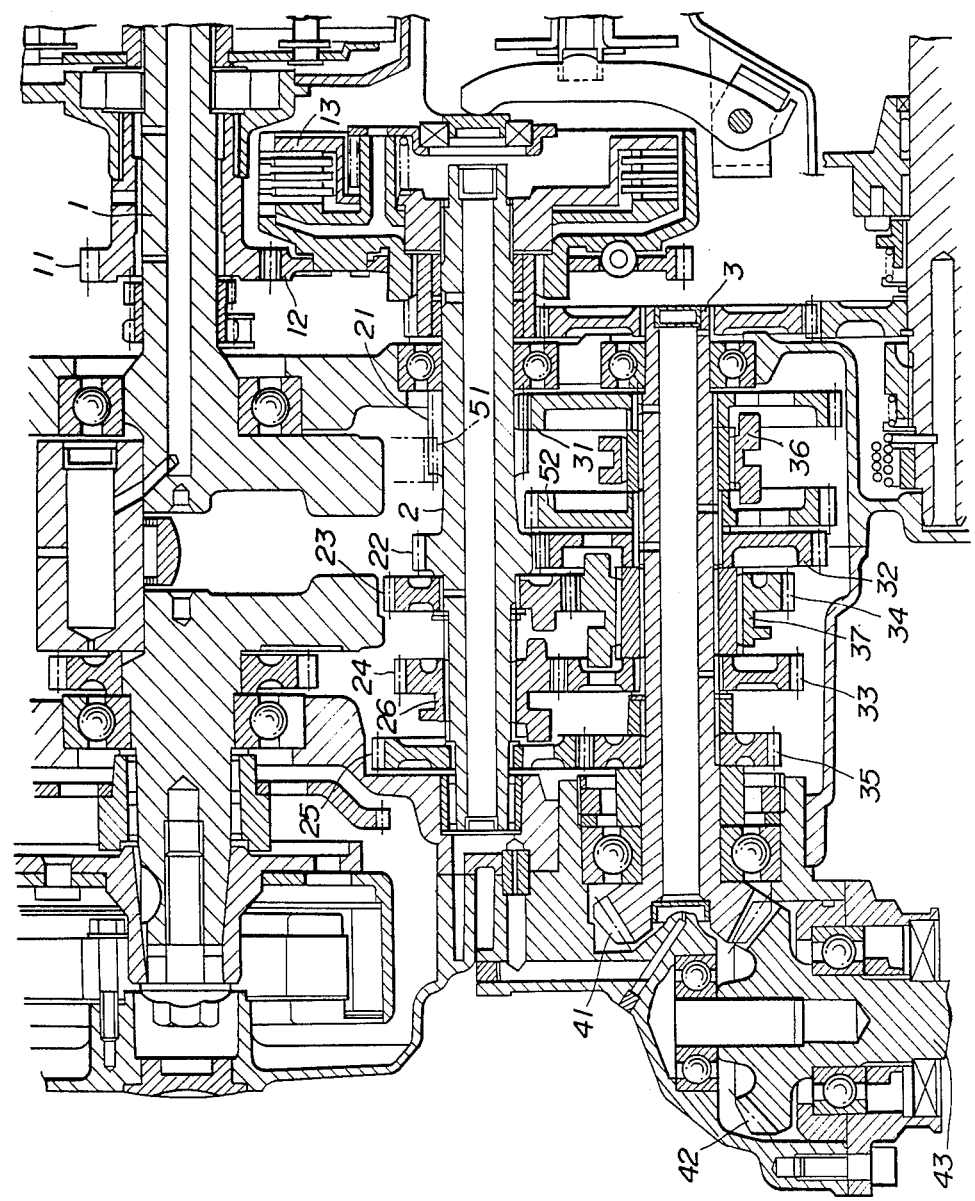
FIG. 1 is a fragmentary cross-sectional view of a vehicle gear transmission incorporating a reverse gear mechanism according to a preferred embodiment of the present invention.

FIG. 1 shows an engine crankshaft 1, and a gear transmission having a primary shaft (first shaft) 2 and a secondary shaft (second shaft) 3. The crankshaft 1, the primary shaft 2, and the secondary shaft 3 are rotatably supported in a casing which serves as an engine crankcase and also as a gear transmission case. The primary shaft 2 supports thereon five drive gears 21, 22, 23, 24, 25. The drive gear 21 which is of a smallest diameter is a low gear doubling as a reverse gear, and is integrally formed with the primary shaft 2. A first shifter 26 is axially slidably but nonrotatably mounted on the primary shaft 2. The drive gear 24 which is a third gear is integral with the first shifter 26. The first shifter 26 functions as a dog clutch for engagement with the drive gear 23 which is a fourth gear and with the drive gear 25 which is a top gear. The drive gears 23, 25 are rotatable with respect to the primary shaft 2. The secondary shaft 3 supports thereon six driven gears 31, 32, 33, 34, 35, 52, a second shifter 36, and a third shifter 37. The second and third shifters 36, 37 serve as dog clutches, respectively. The driven gear 31 which is a low gear and the driven gear 52 which is a reverse gear are rotatable with respect to the secondary shaft 3, and can be fixed thereto by the second shifter 36. The driven gear 34 is a fourth gear integrally formed with the third shifter 37. The gear transmission also has a shift mechanism for operating the three shifters 26, 36, 37 to select desired gears. Such a shift mechanism is of a known structure and hence is not illustrated. The secondary gear 3 has on one end thereof a bevel gear 41 meshing with a bevel gear 42 on the front end of a propeller shaft 43. The rear end of the propeller shaft 43 is operatively coupled to drive wheels through other power transmission members (not shown).

Figure 2:
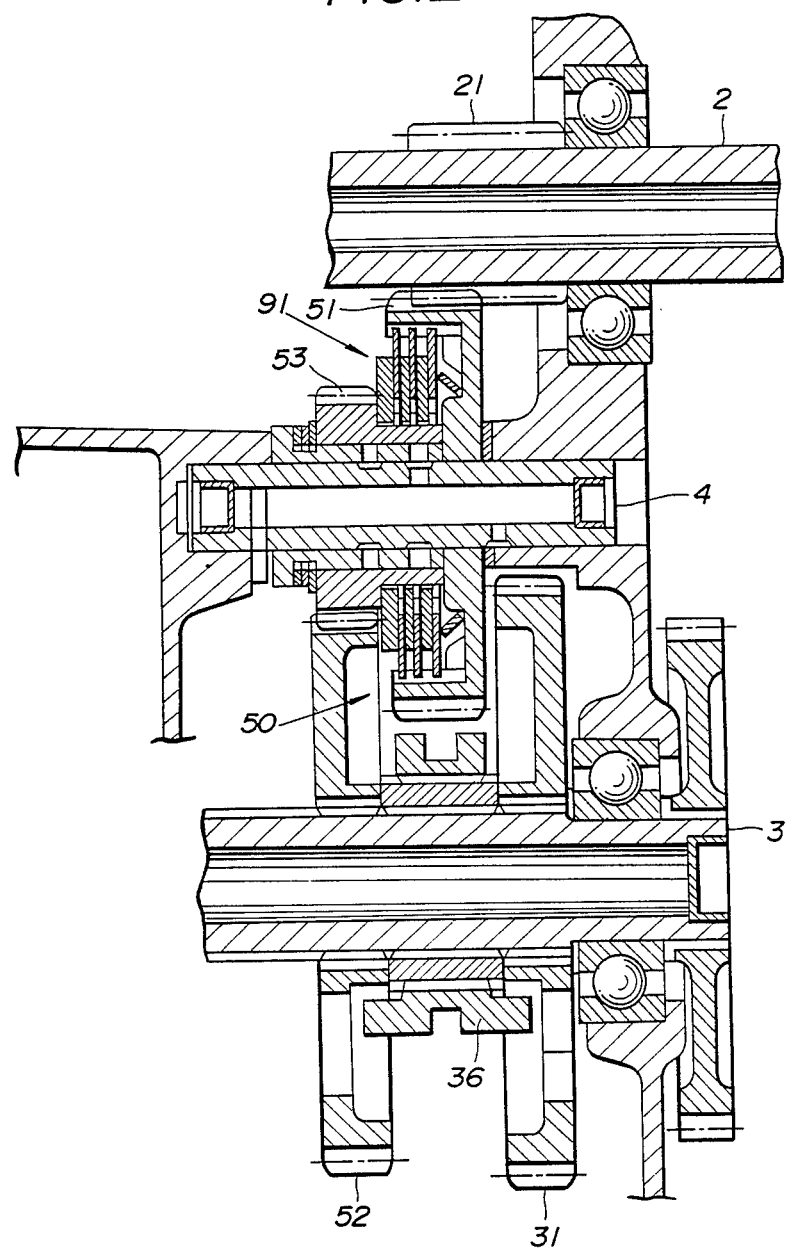
FIG. 2 is a fragmentary cross-sectional view of the reverse gear mechanism of the embodiment of FIG. 1.

FIG. 2 shows an idle gear shaft (third gear) 4 disposed closely to the primary shaft 2 and the secondary shaft 3. The idle gear shaft 4 supports thereon an idle gear assembly 50 serving as a reverse gear. For a fuller understanding of the structure, the cross-sectional view of FIG. 2 is taken along a plane passing through the axes of the idle gear shaft 4 and the primary shaft 2 and a plane passing through the axes of the idle gear shaft 4 and the secondary shaft 3. In reality, therefore, the drive gear 21 and the driven gear 31 shown as being separate from each other in FIG. 2 are held in mesh with each other. The idle gear assembly 50 is composed of a first idle gear 51 meshing with the reverse drive gear 21 on the primary shaft 2, a second idle gear 53 meshing with the reverse driven gear 52 on the secondary shaft 3, and a clutch unit 91 interposed between the first and second idle gears 51, 53. The speed reduction ratio of the reverse gear is smaller than that of the low gear.

Referring back to FIG. 1, the engine power is transmitted from the crankshaft 1 through gears 11, 12 and a clutch 13 to the primary shaft 2, from which the power is transmitted through the gears selected by the shifting mechanism to the secondary shaft 3. The power is then transmitted from the secondary shaft 3 to the propeller shaft 43 through the intermeshing bevel gears 41, 42.

Figure 3:
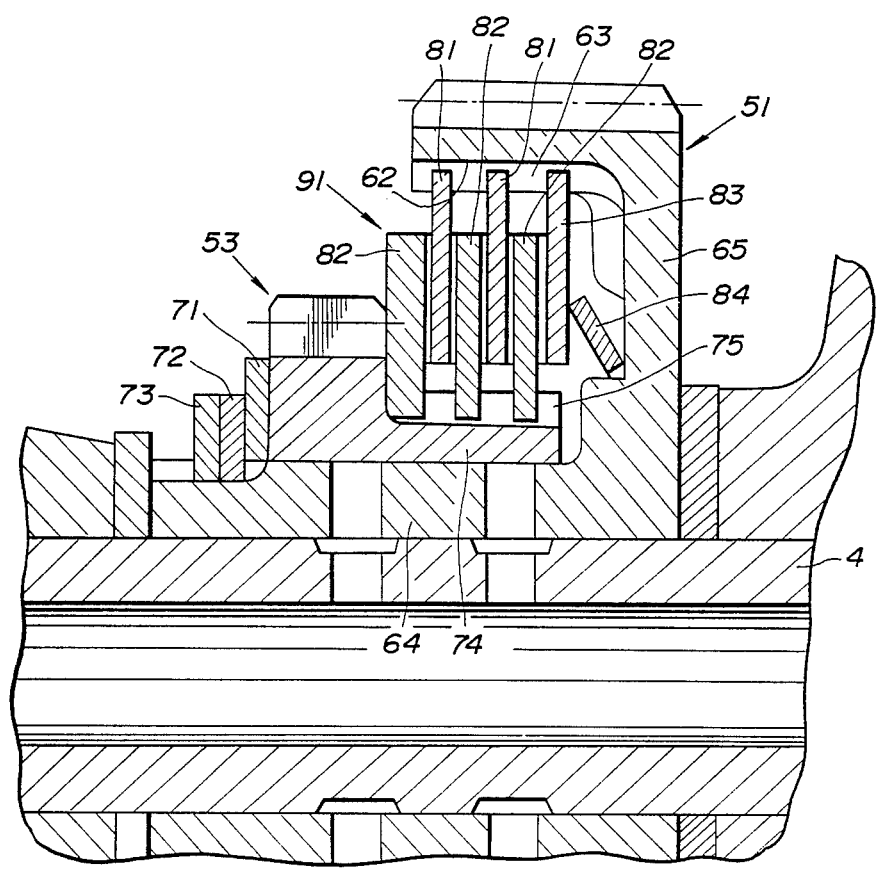
FIG. 3 is an enlarged fragmentary cross-sectional view of an idle gear assembly in the reverse gear mechanism shown in FIG. 2.

As illustrated in FIG. 3, the first idle gear 51 has an annular recess 62 defined in an axial side thereof and opening axially toward the second idle gear 53 and a plurality of angularly spaced axial ridges 63 disposed on the inner peripheral surface of the annular recess 62. The second idle gear 53 is rotatably mounted on a boss 64 of the first idle gear 51 by a thrust washer 71, a stopper 72, and a retaining ring 73. The second idle gear 53 has a boss 74 projecting axially toward the first idle gear 51 having a plurality of angularly spaced axial ridges 75 on its outer peripheral surface.

In the annular recess 62 of the first idle gear 51, there are positioned a plurality of first annular friction plates 81 each having notches defined in its outer peripheral edge and receiving the axial ridges 63, respectively, of the first idle gear 51, and a plurality of second annular friction plates 82 each having notches defined in its inner peripheral edge and receiving the axial ridges 75 of the second idle gear 53, the first and second friction plates 81, 82 being interleaved. The first and second friction plates 81, 82 are therefore rotatable with the first and second idle gears 51, 52, respectively.

The annular recess 62 also accommodates a pressure plate 83 having notches defined in its outer peripheral edge and receiving the ridges 63, respectively, the pressure plate 83 being positioned closely to the bottom 65 of the annular recess 62. The pressure plate 83 is normally urged by a belleville spring 84 held against the bottom 65 to press at a predetermined pressure the first and second friction plates 81, 82 together.

When the vehicle moves back while the torque generated by the engine is not so large, the first and second idle gears 51, 53 rotate together through the clutch unit 91 to transmit the torque from the first idle gear 51 to the second idle gear 53. When the engine torque is large, the first friction plates 81 and the second friction plates 82 slip relatively to each other, and the torque applied to the first idle gear 51 is transmitted only partially to the second idle gear 53. The maximum torque that can be transmitted from the first idle gear 51 to the second idle gear 53 can be selected, or the torque that can be transmitted can be limited to a desired value, as desired by modifying the belleville spring 84, the pressure plate 83, and the friction plates 81, 82. In the embodiment, the clutch unit 91 is designed to slip when the torque is applied between the first and second idle gears 51, 53 which is capable of producing the same torque on the secondary shaft 3 as the possible maximum torque that can be imposed on the secondary shaft 3 when the low gear were selected.

With the aforesaid arrangement, the desired speed reduction ratio for moving back the vehicle can be attained by selecting the numbers of the gear teeth of the drive and driven reverse gears 21, 52 and the first and second idle gears 51, 53. When a large torque is generated by the engine at the time the vehicle is moved back, the transmission of that large torque is limited by the clutch unit 91 to prevent the large torque from being imposed on the secondary shaft 3 and following parts of the power transmission system. As a consequence, the shafts of the power transmission system such as the shafts 2, 3 and the propeller shaft 43, and the brake mechanism can be designed without having regard to the high torque which will be exerted at the largest speed reduction ratio when the vehicle is moved back. Therefore, the rotational inertial mass of the parts of the power transmission system can be reduced for better fuel economy.

The clutch unit 91 disposed in the idle gear assembly 50 is smaller and more compact than would be if it were attached to the rear axle.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

I claim:

1. A reverse gear mechanism in a vehicle gear transmission having a first shaft, a second shaft, and gear train means associated with said first and second shafts for transmitting the torque from one of the first and second shafts to the other, said reverse gear mechanism comprising:
a reverse drive gear supported on said first shaft;
a reverse driven gear supported on said second shaft; and
idle gear means interposed in meshing relation between said reverse drive and driven gears and including a third shaft, a first idle gear supported on said third shaft and meshing with said reverse drive gear, a second idle gear supported on said third gear and meshing with said reverse driven gear, and a clutch unit interposed between said first and second idle gears for limiting the torque transmitted between the first and second idle gears to a prescribed value.

2. A reverse gear mechanism according to claim 1, wherein said clutch unit comprises at least one first friction plate rotatable with said first idle gear, at least one second friction plate rotatable with said second idle gear, and means for pressing, at a predetermined pressure, said first and second friction plates against each other.

3. A reverse gear mechanism according to claim 2, wherein said first idle gear has an annular recess defined in an axial side thereof, said clutch unit being disposed in said annular recess.

4. A reverse gear mechanism according to claim 3, wherein said gear train means includes a low gear, said clutch unit being arranged to slip when the torque is applied between said first and second idle gears which is capable of producing substantially the same torque on said second shaft as the possible maximum torque which can be imposed on said second shaft when said low gear is selected.

5. A reverse gear mechanism according to claim 3, said pressing means comprises a Belleville spring disposed between (i) said first and second friction plates and (ii) an inner side of said annular recess of said first idle gear.

* * * * *